(12) United States Patent
Eronen et al.

(10) Patent No.: US 11,644,528 B2
(45) Date of Patent: May 9, 2023

(54) SOUND SOURCE DISTANCE ESTIMATION (71) Applicant: NOKIA TECHNOLOGIES OY, Espoo (FI)

(72) Inventors: Antti Eronen, Tampere (FI); Arto Lehtiniemi, Lempäälä (FI); Tapani Pihlajakuja, Vantaa (FI); Jussi Leppänen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 456 days.

(21) Appl. No.: 16/626,242

(22) PCT Filed: Jun. 13, 2018

(86) PCT No.: PCT/FI2018/050446
§ 371 (c)(1),
(2) Date: Dec. 23, 2019

(87) PCT Pub. No.: WO2018/234626
PCT Pub. Date: Dec. 27, 2018

(65) Prior Publication Data
US 2020/0217919 A1 Jul. 9, 2020

(30) Foreign Application Priority Data
Jun. 23, 2017 (GB) ...................... 1710083

(51) Int. Cl.
*G10L 25/18* (2013.01)
*G01S 5/28* (2006.01)
(Continued)

(52) U.S. Cl.
CPC ................ *G01S 5/28* (2013.01); *G10L 25/18* (2013.01); *H04R 1/406* (2013.01); *H04R 3/005* (2013.01); *H04R 3/04* (2013.01); *H04R 2430/03* (2013.01)

(58) Field of Classification Search
CPC ........ H04R 1/342; H04R 1/406; H04R 3/005; H04S 7/303; G01S 13/04; G01S 13/08; G01S 13/56; G01S 13/86
(Continued)

(56) References Cited

U.S. PATENT DOCUMENTS 8,204,247 B2 6/2012 Elko et al.
9,354,295 B2 5/2016 Kim et al.
(Continued)

FOREIGN PATENT DOCUMENTS

EP 2 565 667 A1 3/2013
WO WO 2012/066183 A1 5/2012
(Continued)

OTHER PUBLICATIONS

Anand, A. et al., *Comparison of STFT Based Direction of Arrival Estimation Techniques for Speech Signal*, Recent Trends in Electronics, Information & Communication Technology (RTEICT) (May 2016) 200-205.
(Continued)

*Primary Examiner* — William A Jerez Lora
(74) *Attorney, Agent, or Firm* — Alston & Bird LLP (57) ABSTRACT

An apparatus for generating at least one distance estimate to at least one sound source within a sound scene comprising the least one sound source, the apparatus configured to: receive at least two audio signals from a microphone array located within the sound scene; receive at least one further audio signal associated with the at least one sound source; determine at least one portion of the at least two audio signals from a microphone array corresponding to the at least one further audio signal associated with the at least one sound source; determine a distance estimate to the at least one sound source based on the at least one portion of the at least two audio signals from a microphone array correspond-
(Continued)

ing to the at least one further audio signal associated with the at least one sound source.

18 Claims, 7 Drawing Sheets

(51) Int. Cl.
    *H04R 1/40*            (2006.01)
    *H04R 3/00*            (2006.01)
    *H04R 3/04*            (2006.01)

(58) Field of Classification Search
    USPC .................. 381/56, 58, 91, 92, 122, 124
    See application file for complete search history.

(56) References Cited

U.S. PATENT DOCUMENTS

| | | | |
|---|---|---|---|
| 9,357,293 | B2 | 5/2016 | Claussen |
| 9,430,931 | B1* | 8/2016 | Liu .................. G08B 21/24 |
| 9,549,253 | B2 | 1/2017 | Alexandridis et al. |
| 9,832,587 | B1* | 11/2017 | Park .................. H04S 7/303 |
| 2011/0019835 | A1* | 1/2011 | Schmidt ............. H04R 3/005 381/71.11 |
| 2013/0156198 | A1* | 6/2013 | Kim .................. H04R 1/323 381/17 |
| 2013/0300648 | A1 | 11/2013 | Kim et al. |
| 2018/0310097 | A1 | 10/2018 | Takahashi et al. |

FOREIGN PATENT DOCUMENTS

| | | |
|---|---|---|
| WO | WO 2013/024200 A1 | 2/2013 |
| WO | WO 2014/179308 A1 | 11/2014 |
| WO | WO 2017/005981 A1 | 1/2017 |
| WO | WO 2017/064367 A1 | 4/2017 |
| WO | WO 2017/064368 A | 4/2017 |
| WO | WO 2017/073324 A1 | 5/2017 |
| WO | WO 2018/234628 A1 | 12/2018 |

OTHER PUBLICATIONS

Tamai, Y. et al., *Three Ring Microphone Array for 3D Sound Localization and Separation for Mobile Robot Audition*, Proceedings of the IEEE IRS/RSJ International Conference on Intelligent Robots and Systems, IROS 2005, 6 pages.

International Search Report and Written Opinion for Application No. PCT/FI2018/050446 dated Sep. 19, 2018, 12 pages.

Extended European Search Report for European Application No. 18821234.4 dated Feb. 15, 2021, 8 pages.

\* cited by examiner

SOUND SOURCE DISTANCE ESTIMATION

CROSS-REFERENCE TO RELATED APPLICATIONS

The present application is a national phase entry of International Application No. PCT/FI2018/050446, filed Jun. 13, 2018, which claims priority to GB Application No. 1710083.5, filed on Jun. 23, 2017, the contents of which are incorporated herein by reference in their entirety.

FIELD

The present application relates to apparatus and methods for sound source estimation, but not exclusively for sound source distance estimation for spatial audio mixing applications.

BACKGROUND

Capture of audio signals from multiple sources and mixing of audio signals when these sources are moving in the spatial field requires significant effort. For example the capture and mixing of an audio signal source such as a speaker or artist within an audio environment such as a theatre or lecture hall to be presented to a listener and produce an effective audio atmosphere requires significant investment in equipment and training.

A commonly implemented system is where one or more 'external' microphones, for example a Lavalier microphone worn by the user or an audio channel associated with an instrument, is mixed with a suitable spatial (or environmental or audio field) audio signal such that the produced sound comes from an intended direction. This system is known in some areas a Spatial Audio Mixing (SAM).

The SAM system enables the creation of immersive sound scenes comprising "background spatial audio" or ambiance and sound objects for Virtual Reality (VR) applications. Often, the scene can be designed such that the overall spatial audio of the scene, such as a concert venue, is captured with a microphone array (such as one contained in the OZO virtual camera) and the most important sources captured using the 'external' microphones.

The SAM system typically employs a radio-based indoor positioning system (such as high accuracy indoor positioning—HAIP) which can provide estimates of a sound source direction of arrival (DOA) as azimuth and elevation values. However, for full positioning a distance estimate is required as well. In other words a distance estimate is required in order to obtain full spherical coordinates (azimuth, elevation, distance). The determination of a distance estimate would allow, for example, free listening point rendering of the sound sources, and rendering changes in the close-up audio signal as the distance changes. If distance information is not available, then free listening point audio rendering cannot be performed as when the listening position changes by a certain vector from its original position, the full original vector from the listening point to the sound source is needed to be able to determine the new vector from the new listening point to the sound source.

The lack of free listening point ability significantly limits the immersive audio experience since the user is only able to rotate their head not move their head to a different position within the sound scene and for example to listen to some sources more closely or explore different locations of the sound scene.

Moreover, without distance information then for fixed listening point audio rendering a distance (which is typically defined at 2 meters) is defined which is used to adjust the sound source volume or otherwise require a sound engineer to do this manually. Having full source positions sound rendering can be performed in such a way that the sound changes according to the distance of the sound source from the listener (so that the sound gets louder and the proportion of direct sound increases as the sound source approaches the listener).

SUMMARY

There is provided according to a first aspect an apparatus for generating at least one distance estimate to at least one sound source within a sound scene comprising the least one sound source, the apparatus configured to: receive at least two audio signals from a microphone array located within the sound scene; receive at least one further audio signal associated with the at least one sound source; determine at least one portion of the at least two audio signals from a microphone array corresponding to the at least one further audio signal associated with the at least one sound source; determine a distance estimate to the at least one sound source based on the at least one portion of the at least two audio signals from a microphone array corresponding to the at least one further audio signal associated with the at least one sound source.

The apparatus configured to determine at least one portion of the at least two audio signals from a microphone array corresponding to the at least one further audio signal associated with the at least one sound source may be configured to identify at least one sub-band of the at least two audio signals, the at least one sub-band associated with the at least one sound source.

The apparatus configured to determine a distance estimate to the at least one sound source based on the at least one portion of the at least two audio signals from a microphone array corresponding to the at least one further audio signal associated with the at least one sound source may be configured to:
determine at least one audio sub-band positioning system direction of arrival estimate based on the identified sub-band of the at least two audio signals from a microphone array corresponding to the at least one further audio signal associated with the at least one sound source;
determine a variance based on the at least one audio sub-band positioning system direction of arrival estimate associated with the at least one sound source; and
determine the distance estimate to the at least one sound source based on the determined variance.

The apparatus configured to determine a variance based on the at least one audio sub-band positioning system direction of arrival estimate associated with the at least one sound source may be configured to: combine the identified sub-band direction of arrival estimates; divide the combined direction of arrival estimates by the cardinality of the at least one audio sub-band positioning system direction of arrival estimates; determine the distance between 1 and the divided combined estimates; and square root the distance to determine the variance.

The apparatus configured to determine a variance based on the at least one audio sub-band positioning system direction of arrival estimate associated with the at least one sound source may be further configured to determine the variance based on the at least one audio sub-band positioning system direction of arrival estimate associated with the at least one sound source and a direction of arrival estimate and the at least one radio based positioning system direction of arrival estimate.

The apparatus configured to determine a distance estimate to the at least one sound source based on the at least one portion of the at least two audio signals from a microphone array corresponding to the at least one further audio signal associated with the at least one sound source may be configured to determine the distance estimate to the at least one sound source based on the at least one portion of the at least two audio signals from a microphone array corresponding to the at least one further audio signal associated with the at least one sound source and the at least one radio-based positioning system direction of arrival estimate associated with the at least one sound source.

The apparatus may be further configured to receive at least one radio-based positioning system direction of arrival estimate associated with the at least one sound source.

The radio-based positioning system may be a high accuracy indoor positioning system.

The apparatus configured to determine a variance based on the at least one audio sub-band positioning system direction of arrival estimate and the at least one radio-based positioning system direction of arrival estimate associated with the at least one sound source may be configured to: combine the at least one audio sub-band positioning system direction of arrival estimates and the at least one radio-based positioning system direction of arrival estimates; divide the combined estimates by the cardinality of the at least one audio sub-band positioning system direction of arrival estimates and the at least one radio-based positioning system direction of arrival estimates; determine the distance between 1 and the divided combined estimates; and square root the distance.

The apparatus configured to determine at least one audio sub-band positioning system direction of arrival estimate may be configured to: determine a time delay between the at least two audio signals from apparatus microphones located within the sound scene for the sub-band part of the at least two audio signals; and determine the at least one audio sub-band positioning system direction of arrival based on the time delay.

The apparatus configured to identify at least one sub-band of the at least two audio signals, the at least one sub-band associated with the at least one sound source may be configured to: combine the at least two audio signals from the microphone array to generate a sum audio signal; filter the sum audio signal to generate sub-bands of the sum audio signal; compare the sub-bands of the sum audio signal to at least part of the at least one further audio signal associated with the at least one sound source; and identify the at least one sub-band based on the comparison.

The at least part of the at least one further audio signal associated with the at least one sound source may comprise at least one of: a sub-band filtered version of the at least one further audio signal; and the at least one further audio signal.

The apparatus may be further configured to determine a position estimate for the at least one sound source comprising the combination of the at least one distance estimate to the at least one sound source based on the at least one portion of the at least two audio signals from a microphone array corresponding to the at least one further audio signal associated with the at least one sound source and the direction of arrival estimate associated with the at least one sound source.

According to a second aspect there is provided a method for generating at least one distance estimate to at least one sound source within a sound scene comprising the least one sound source, the method comprising: receiving at least two audio signals from a microphone array located within the sound scene; receiving at least one further audio signal associated with the at least one sound source; determining at least one portion of the at least two audio signals from a microphone array corresponding to the at least one further audio signal associated with the at least one sound source; determining a distance estimate to the at least one sound source based on the at least one portion of the at least two audio signals from a microphone array corresponding to the at least one further audio signal associated with the at least one sound source.

Determining at least one portion of the at least two audio signals from a microphone array corresponding to the at least one further audio signal associated with the at least one sound source may comprise identifying at least one sub-band of the at least two audio signals, the at least one sub-band associated with the at least one sound source.

Determining a distance estimate to the at least one sound source based on the at least one portion of the at least two audio signals from the microphone array corresponding to the at least one further audio signal associated with the at least one sound source may comprise: determining at least one audio sub-band positioning system direction of arrival estimate based on the identified sub-band of the at least two audio signals from the microphone array corresponding to the at least one further audio signal associated with the at least one sound source; determining a variance based on the at least one audio sub-band positioning system direction of arrival estimate associated with the at least one sound source; and determining the distance estimate to the at least one sound source based on the determined variance.

Determining a variance based on the at least one audio sub-band positioning system direction of arrival estimate associated with the at least one sound source may comprise: combining the identified sub-band direction of arrival estimates; dividing the combined direction of arrival estimates by the cardinality of the at least one audio sub-band positioning system direction of arrival estimates; determining the distance between 1 and the divided combined estimates; and square rooting the distance to determine the variance.

Determining a variance based on the at least one audio sub-band positioning system direction of arrival estimate associated with the at least one sound source further may comprise determining the variance based on the at least one audio sub-band positioning system direction of arrival estimate associated with the at least one sound source and a direction of arrival estimate and the at least one radio based positioning system direction of arrival estimate.

Determining a distance estimate to the at least one sound source based on the at least one portion of the at least two audio signals from a microphone array corresponding to the at least one further audio signal associated with the at least one sound source may comprise determining the distance estimate to the at least one sound source based on the at least one portion of the at least two audio signals from a microphone array corresponding to the at least one further audio signal associated with the at least one sound source and the at least one radio-based positioning system direction of arrival estimate associated with the at least one sound source.

The method may further comprise receiving at least one radio-based positioning system direction of arrival estimate associated with the at least one sound source.

The radio-based positioning system may be a high accuracy indoor positioning system.

Determining a variance based on the at least one audio sub-band positioning system direction of arrival estimate and the at least one radio-based positioning system direction of arrival estimate associated with the at least one sound source may comprise: combining the at least one audio sub-band positioning system direction of arrival estimates and the at least one radio-based positioning system direction of arrival estimates; dividing the combined estimates by the cardinality of the at least one audio sub-band positioning system direction of arrival estimates and the at least one radio-based positioning system direction of arrival estimates; determining the distance between 1 and the divided combined estimates; and square rooting the distance.

Determining at least one audio sub-band positioning system direction of arrival estimate may comprise: determining a time delay between the at least two audio signals from method microphones located within the sound scene for the sub-band part of the at least two audio signals; and determining the at least one audio sub-band positioning system direction of arrival based on the time delay.

Identifying at least one sub-band of the at least two audio signals, the at least one sub-band associated with the at least one sound source may comprise: combining the at least two audio signals from the microphone array to generate a sum audio signal; filtering the sum audio signal to generate sub-bands of the sum audio signal; comparing the sub-bands of the sum audio signal to at least part of the at least one further audio signal associated with the at least one sound source; and identifying the at least one sub-band based on the comparison.

The at least part of the at least one further audio signal associated with the at least one sound source may comprise at least one of: a sub-band filtered version of the at least one further audio signal; and the at least one further audio signal.

The method may further comprise determining a position estimate for the at least one sound source comprising the combination of the at least one distance estimate to the at least one sound source based on the at least one portion of the at least two audio signals from a microphone array corresponding to the at least one further audio signal associated with the at least one sound source and the direction of arrival estimate associated with the at least one sound source.

According to a third aspect there is provided an apparatus for generating at least one distance estimate to at least one sound source within a sound scene comprising the least one sound source, the apparatus comprising: means for receiving at least two audio signals from a microphone array located within the sound scene; means for receiving at least one further audio signal associated with the at least one sound source; means for determining at least one portion of the at least two audio signals from a microphone array corresponding to the at least one further audio signal associated with the at least one sound source; means for determining a distance estimate to the at least one sound source based on the at least one portion of the at least two audio signals from a microphone array corresponding to the at least one further audio signal associated with the at least one sound source.

The means for determining at least one portion of the at least two audio signals from a microphone array corresponding to the at least one further audio signal associated with the at least one sound source may comprise means for identifying at least one sub-band of the at least two audio signals, the at least one sub-band associated with the at least one sound source.

The means for determining a distance estimate to the at least one sound source based on the at least one portion of the at least two audio signals from the microphone array corresponding to the at least one further audio signal associated with the at least one sound source may comprise: means for determining at least one audio sub-band positioning system direction of arrival estimate based on the identified sub-band of the at least two audio signals from the microphone array corresponding to the at least one further audio signal associated with the at least one sound source; means for determining a variance based on the at least one audio sub-band positioning system direction of arrival estimate associated with the at least one sound source; and means for determining the distance estimate to the at least one sound source based on the determined variance.

The means for determining a variance based on the at least one audio sub-band positioning system direction of arrival estimate associated with the at least one sound source may comprise: means for combining the identified sub-band direction of arrival estimates; means for dividing the combined direction of arrival estimates by the cardinality of the at least one audio sub-band positioning system direction of arrival estimates; means for determining the distance between 1 and the divided combined estimates; and means for square rooting the distance to determine the variance.

The means for determining a variance based on the at least one audio sub-band positioning system direction of arrival estimate associated with the at least one sound source further may comprise means for determining the variance based on the at least one audio sub-band positioning system direction of arrival estimate associated with the at least one sound source and a direction of arrival estimate and the at least one radio based positioning system direction of arrival estimate.

The means for determining a distance estimate to the at least one sound source based on the at least one portion of the at least two audio signals from a microphone array corresponding to the at least one further audio signal associated with the at least one sound source may comprise means for determining the distance estimate to the at least one sound source based on the at least one portion of the at least two audio signals from a microphone array corresponding to the at least one further audio signal associated with the at least one sound source and the at least one radio-based positioning system direction of arrival estimate associated with the at least one sound source.

The apparatus may further comprise means for receiving at least one radio-based positioning system direction of arrival estimate associated with the at least one sound source.

The radio-based positioning system may be a high accuracy indoor positioning system.

The means for determining a variance based on the at least one audio sub-band positioning system direction of arrival estimate and the at least one radio-based positioning system direction of arrival estimate associated with the at least one sound source may comprise: means for combining the at least one audio sub-band positioning system direction of arrival estimates and the at least one radio-based positioning system direction of arrival estimates; means for dividing the combined estimates by the cardinality of the at least one audio sub-band positioning system direction of arrival estimates and the at least one radio-based positioning system direction of arrival estimates; means for determining the distance between 1 and the divided combined estimates; and means for square rooting the distance.

The means for determining at least one audio sub-band positioning system direction of arrival estimate may comprise: means for determining a time delay between the at least two audio signals from apparatus microphones located within the sound scene for the sub-band part of the at least two audio signals; and means for determining the at least one audio sub-band positioning system direction of arrival based on the time delay.

The means for identifying at least one sub-band of the at least two audio signals, the at least one sub-band associated with the at least one sound source may comprise: means for combining the at least two audio signals from the microphone array to generate a sum audio signal; means for filtering the sum audio signal to generate sub-bands of the sum audio signal; means for comparing the sub-bands of the sum audio signal to at least part of the at least one further audio signal associated with the at least one sound source; and means for identifying the at least one sub-band based on the comparison.

The at least part of the at least one further audio signal associated with the at least one sound source may comprise at least one of: a sub-band filtered version of the at least one further audio signal; and the at least one further audio signal.

The apparatus may further comprise means for determining a position estimate for the at least one sound source comprising the combination of the at least one distance estimate to the at least one sound source based on the at least one portion of the at least two audio signals from a microphone array corresponding to the at least one further audio signal associated with the at least one sound source and the direction of arrival estimate associated with the at least one sound source.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The following describes in further detail suitable apparatus and possible mechanisms for the provision of effective sound source distance determination from the capture of audio signals from multiple devices. As discussed this is a desired parameter used in the mixing of the audio signals. In the following examples, audio signals and audio capture signals are described.

The concept as discussed in further detail hereafter is apparatus and methods for obtaining distance estimates for sound sources tracked with 'inside-out' radio-based positioning system. An 'inside-out' configuration generally features a radio-based positioning system (such as a high accuracy indoor positioning—HAIP) is only able to provide estimates of the direction of arrival such as azimuth, elevation. The 'inside-out' configuration has at least two significant benefits. Firstly it is has a very attractive form factor and can be deployed, for example, on the same camera stand as a virtual reality camera. Secondly it does not require any calibration but is ready to be used out-of-the-box. However, its limitation is that it does not provide us with distance estimates, which if required need to be obtained otherwise.

The embodiments as discussed hereafter thus utilize a microphone array, such as Nokia's OZO capture apparatus, to obtain distance estimates of sound sources which are also captured using external microphones. The system as discussed herein is able to identify which frequency bands of the audio signals generated from the array microphone capture apparatus likely contain frequency bands of each sound source, and then the fluctuation (variance) of direction of arrival (DOA) estimates of those frequency bands can be used to obtain a distance estimate for the sources. The distance information may then be combined with the azimuth and elevation (or DOA) information obtained from the radio-based positioning system, to generate full position information for sound sources tracked with an inside-out positioning configuration+a microphone array.

Furthermore in some embodiments the apparatus may be used to improve the reliability of radio-positioning based DOA estimates with audio-based DOA estimates.

The embodiments as discussed hereafter may be implemented as part of a Spatial Audio Mixing (SAM) system, where the sources and/or the listening (or viewing) position is able to be located based on a user or other input and as such the accurate full position information associated with each sound source is required to be able to spatially position the sound source within the sound scene relative to the listener. The concept as described herein thus may be considered to be enhancement to conventional Spatial Audio Capture (SPAC) technology. Spatial audio capture technology can process audio signals captured via a microphone array into a spatial audio format. In other words generating an audio signal format with a spatial perception capacity. The concept may thus be embodied in a form where audio signals may be captured such that, when rendered to a user, the user can experience the sound field as if they were present at the location of the capture device. Spatial audio capture can be implemented for microphone arrays found in mobile devices. In addition, audio processing derived from the spatial audio capture may be used employed within a presence-capturing device such as the Nokia OZO (OZO) devices.

A conventional approach to the capturing and mixing of audio sources with respect to an audio background or environment audio field signal would be for a professional producer to utilize a sound source microphone (which is also known as an external microphone, a close or Lavalier microphone worn by the user, or a microphone attached to an instrument or some other microphone) to capture audio signals close to the sound source, and further utilize a 'background' microphone or microphone array to capture a environmental audio signal. These signals or audio tracks may then be manually mixed to produce an output audio signal such that the produced sound features the sound source coming from an intended (though not necessarily the original) direction.

Although capture and render systems may be separate, it is understood that they may be implemented with the same apparatus or may be distributed over a series of physically separate but communication capable apparatus. For example, a presence-capturing device such as the OZO device could be equipped with an additional interface for receiving location data and close microphone audio signals, and could be configured to perform the capture part. The output of a capture part of the system may be the microphone audio signals (e.g. as a 5.1 channel downmix), the close microphone audio signals (which may furthermore be time-delay compensated to match the time of the microphone array audio signals), and the position information of the close microphones (such as a time-varying azimuth, elevation, distance with regard to the microphone array).

The renderer as described herein may be an audio playback device (for example a set of headphones), user input (for example motion tracker), and software capable of mixing and audio rendering. In some embodiments the user input and audio rendering parts may be implemented within a computing device with display capacity such as a mobile phone, tablet computer, virtual reality headset, augmented reality headset etc.

Furthermore it is understood that at least some elements of the following mixing and rendering may be implemented within a distributed computing system such as known as the 'cloud'.

Figure 1:
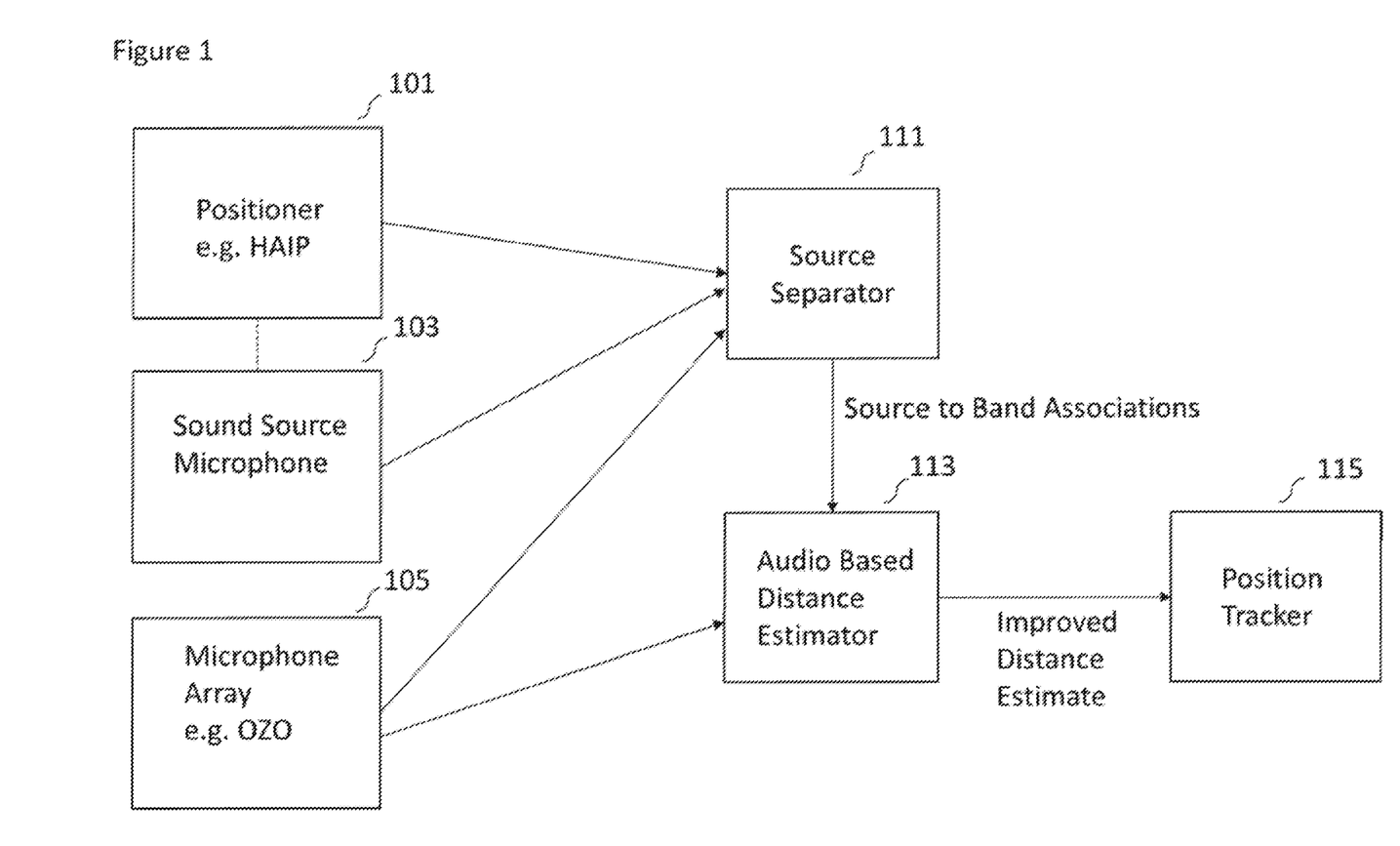
FIG. 1 shows schematically an example apparatus suitable for implementing some embodiments.

With respect to FIG. 1 an example system comprising apparatus suitable for implementing some embodiments is shown.

FIG. 1 shows an example sound source microphone (and tag) 103 which is configured to transmit HAIP signals which are received by the positioner 101 in order to determine the direction of arrival (DOA) and actual position of the sound source microphone 103 relative to the microphone array 105. The sound source microphone may furthermore generate a sound source audio signal which is passed to the source separator 111. Although in the following examples there is shown one example sound source microphone it is understood that there may be more than one sound source microphone. As described herein the sound source microphone 103 can be configured to capture audio signals associated with humans, instruments, or other sound sources of interest.

For example the sound source microphone 103 may be a Lavalier microphone. The sound source microphone may be any microphone external or separate to a microphone array which may capture the spatial audio signal. Thus the concept is applicable to any external/additional microphones be they Lavalier microphones, hand held microphones, mounted mics, or whatever. The sound source microphone can be worn/carried by persons or mounted as close-up microphones for instruments or a microphone in some relevant location which the designer wishes to capture accurately. A Lavalier microphone typically comprises a small microphone worn around the ear or otherwise close to the mouth. For other sound sources, such as musical instruments, the audio signal may be provided either by a Lavalier microphone or by an internal microphone system of the instrument (e.g., pick-up microphones in the case of an electric guitar) or an internal audio output (e.g., a electric keyboard output). In some embodiments the sound source microphone may be configured to output the captured audio signals to the source separator 111 wirelessly. The sound source microphone may in such embodiments be connected to a transmitter unit (not shown), which wirelessly transmits the audio signal to a receiver unit (not shown) within the source separator 111.

In some embodiments the sound source microphone and thus the performers and/or the instruments that are being played positions may be tracked by using position tags located on or associated with the sound source microphone. Thus for example the sound source microphone comprises or is associated with a microphone position tag.

In some embodiments the system comprises a positioner 101. The positioner 101 may be a configured to comprise a receiver which is configured to receive the radio signal transmitted by the microphone position tag such that the positioner 101 may determine information identifying the position or location of the sound source microphone. In some embodiments the positioner 101 is configured to determine the azimuth or the elevation of the sound source microphone relative to the positioner receiver. In some other embodiments the positioner 101 is configured to determine both the azimuth and the elevation of the sound source microphone relative to the positioner receiver.

Although the following examples show the use of the HAIP (high accuracy indoor positioning) radio frequency signal to determine the location of the close microphones it is understood that any suitable position estimation system may be used (for example satellite-based position estimation systems, inertial position estimation, beacon based position estimation etc.). The positioner 101 may be configured to output the 'radio-based' position estimate of the sound source microphone to the source separator 111.

In some embodiments the system comprises a microphone array 105. The microphone array 105 may comprise a plurality of microphones configured to capture a plurality of audio signals which represent the sound scene. The microphone array 105 may be configured to output the audio signals to the source separator 111 and furthermore to the audio based distance estimator 113. In some embodiments the microphone array may be configured to output the captured audio signals to the source separator 111/audio based distance estimator 113 wirelessly. The microphone array 105 may in such embodiments be connected to a transmitter unit (not shown), which wirelessly transmits the audio signal to a receiver unit (not shown) within the source separator 111/audio based distance estimator 113. In some embodiments the microphone array 105 is implemented as part of a presence capture apparatus or device such as a Nokia OZO.

The system in some embodiments comprises a source separator 111. The source separator is configured in some embodiments to receive the audio signals from the sound source microphone 103, the microphone array 105 and receive the radio based position estimates from the positioner 101. The source separator 111 is then configured to identify parts of the microphone array audio signals which represent the audio signals generated by the sound source microphone. These identified parts may then be passed to the audio based distance estimator 113. In some embodiments as described in detail hereafter the source separator 111 is configured to indicate frequency bands within the microphone array audio signals which are similar to the audio signals from the sound source microphone.

The system in some embodiments comprises an audio based distance estimator 113. The audio based distance estimator in some embodiments is configured to receive the audio signals from the microphone array 105 and furthermore indications of which parts of the microphone array 105 audio signals are associated with the audio signals from the sound source microphone 103 in order to enable the audio based distance estimator 113 to generate a distance estimate of the sound source. The distance estimate may be passed in some embodiments to a position tracker 115.

In some embodiments the system comprises a position tracker 115. The position tracker 115 may be configured to receive the audio based distance estimate from the audio based distance estimator 113 and the positioner estimator estimates of the azimuth and/or elevation and combine these to generate a complete position estimate of the sound source. In some embodiments the position tracker 115 is further configured to update the radio based direction of arrival estimates using audio based direction of arrival estimates generated by the audio based distance estimator 113.

Figure 2:
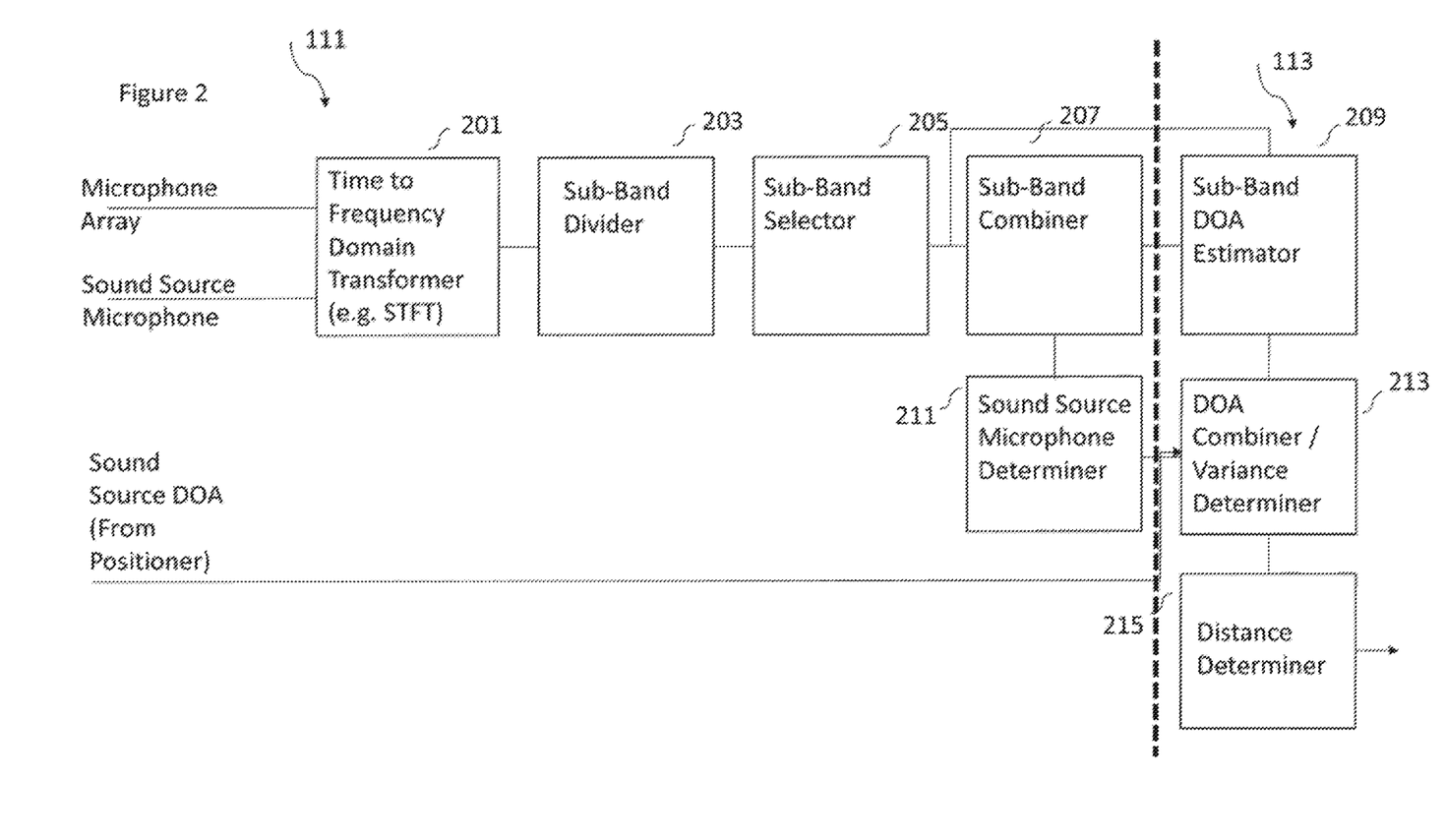
FIG. 2 shows schematically the source separator and audio based distance estimator as shown in FIG. 1 according to some embodiments.

With respect to FIG. 2 a schematic view of example source separator and audio based distance estimator apparatus is shown in further detail.

In some embodiments the source separator comprises a time to frequency domain transformer 201. The time to frequency domain transformer 201 may be configured to receive the microphone array 105 audio signals and the sound source microphone 103 audio signal and apply a suitable time to frequency domain transform such as a Short Time Fourier Transform (STFT) in order to convert the input time domain signals into a suitable frequency domain representation.

The external microphone capture signal is subjected to the same STFT analysis as a channel in the array capture. The frequency domain representation is divided into B subbands. Thus for example the sound source microphone audio signal Y may be represented in the frequency domain as $$Y^b(n) = Y(n_b + n), n = 0, \ldots, n_{b+1} - n_b - 1, b = 0, \ldots, B-1$$

The microphone array audio signals may be represented in the frequency domain representation by $$X_k^b(n) = X_k(n_b + n), n = 0, \ldots, n_{b+1} - n_b - 1, b = 0, \ldots, B-1$$

The widths of the subbands can follow any suitable distribution. For example the Equivalent rectangular bandwidth (ERB) scale. The value of n represents a discrete frequency and k the microphone channel index.

The frequency domain representations may be output to a sub-band divider.

In some embodiments the source separator comprises a sub-band divider 203. The sub-band divider is configured to receive the frequency domain representations of the microphone array audio signals and the sound source microphone audio signal and generate sub-band versions.

These sub-bands may be passed to a sub-band selector 205.

In some embodiments the sound separator comprises a sub-band selector 205. The sub-band selector is configured to receive the sub-band representations of the audio signals and select a sub-band for analysis.

The selection may for example be a loop control operation whereby a sub-band 'b' is selected and passed to the sub-band combiner 207 and a sub-band direction of arrival (DOA) estimator 209.

In some embodiments the audio-based distance estimator comprises a sub-band direction of arrival (DOA) estimator 209. The sub-band DOA estimator 209 in some embodiments is configured to receive the sub-band audio signal components from the source separator and determine an audio signal based direction of arrival estimation. This for example may be azimuth estimation and/or an elevation estimation. The estimator 209 may use any suitable estimation technique. For example in some embodiments the estimator 209 is configured to estimate the direction with two channels (in the example implementation channels 2 and 3). The task is to find delay $\tau_b$ that maximizes the correlation between the two channels for subband b. In other words attempting to determine a DOA based on estimated impulse responses from one audio signal (from a first microphone) to another audio signal (from another microphone). This can be accomplished by creating time-shifted versions of the signal in channel 2, and correlating these with the signal on channel 3.

A time shift of $\tau$ time domain samples of $X_k^b(n)$ can be obtained as $$X_{k,\tau_b}^b(n) = X_k^b(n) e^{-j\frac{2\pi n \tau}{N}}.$$

Now the optimal delay $\tau_b$ is obtained from $$\max_{\tau_b} \text{Re}(X_{2,\tau_b}^b {}^* X_3^b), \tau_b \in [-D_{max}, D_{max}]$$

where Re indicates the real part of the result and * denotes combined transpose and complex conjugate operations. $X_{2,\tau_b}^b$ and $X_3^b$ are considered vectors with length of $n_{b+1} - n_b$ samples. The range of searching for the delay $D_{max}$ is selected based on the estimated maximum time delay of sound arrival to two microphones. Knowing the physical distribution of the channel microphones then permits the direction of arrival estimator to determine a first direction of arrival based on the delay.

By performing this analysis between further channels additional directions may be determined which improve the direction of arrival estimation and/or enable the direction of arrival estimation to resolve whether the direction of arrival is forwards of or to the rear of the microphone array, and further determine both an azimuth and elevation direction of arrival.

In some embodiments this delay information may be passed to the sub-band combiner 207

The sound separator in some embodiments further comprises a sub-band combiner 207. The sub-band combiner 207 is configured to generate a combined microphone array audio signal for the sub band. Thus for example the sub-band combiner 207 may be configured to generate for the sub-band b:

$$X_{sum}^b = \sum_{k=1}^{k=K} X_k^b(n).$$

In some embodiments the sub-band combiner 207 is configured to generate the combined (sum) signal using the following logic $$X_{sum}^b = \begin{cases} (X_{2,\tau_b}^b + X_3^b)/2 & \tau_b \geq 0 \\ (X_2^b + X_{3,\tau_b}^b)/2 & \tau_b < 0 \end{cases}$$

In other word in some embodiments the sub-band combiner 207 is configured to receive the delay value from the sub-band DOA estimator 209 before generating the combined sub-band signal.

Having generated the sum or combined audio signal for the sub-band b, the sum may be passed to the sound source microphone determiner 211.

In some embodiments the source separator 111 comprises a sound source determiner 211. The sound source determiner 211 is configured to receive the sum or combined audio signal for the sub-band b and the sound source microphone(s) audio signal sub-band b components and determine whether the combined audio signals corresponds to the sound source microphone audio signal. In some embodiments where there are more than one sound source the sound source determiner may be configured to identify which sound source microphone the combined audio signal corresponds to.

In some embodiments the sound source microphone determiner is configured to identify such frequency bands in the microphone array capture which contain mostly the sound source microphone signal for calculating for the sub-band b $$c = \max_{\hat{\tau}_b} \text{Re}\left(Y_{\hat{\tau}_b}^b {}^* X_{sum}^b\right), \hat{\tau}_b \in \left[-\hat{D}_{max}, \hat{D}_{max}\right]$$

Where c is above a predetermined threshold, then the sound source microphone determiner is configured to conclude that $X_{sum}^b(n)$ is dominated by $Y^b(n)$ and assign $y_i=b$. The value of the threshold may in some embodiments be obtained by analyzing typical values of the correlation and selecting such a value which typically indicates a high probability of match (say 90% of values above the threshold are true matches). It is noted that a band b does not need to correspond to any sound source microphone captured source, for example the audio signal may be dominated by noise. In this case it is not used for updating information for any sound source.

As a result of the determination, we obtain a subset $\{y_i\}$, $y_i \in [0, \ldots, B]$, of frequency bands $b=0, \ldots, B-1$ such that sound Y is likely the dominant sound captured by the microphone array at each selected band $y_i$.

In some embodiments the audio based distance estimator 113 comprises a direction of arrival combiner 213. The direction of arrival (DOA) combiner 213 may be configured to receive the DOA estimates for the sub-bands and the indications of which sub-bands are associated with which sound source microphone. The DOA combiner may then calculate the circular variance $s_{y_i}$ of the DOA estimates over the identified bands associated with a defined sound source microphone. This in some embodiments may be performed over the bands $\{y_i\}$:

$$s_{y_i} = \sqrt{1 - \left|\frac{1}{\text{card}\{y_i\}} \sum_{y \in \{y_i\}} \theta_y\right|}$$

where card denotes the cardinality of a set. The variance may be output to a distance determiner 215.

In some embodiments the audio based distance determiner comprises a distance determiner 215. The distance determiner is configured to receive the variance values and from these determine the distance associated with the sound source. In some embodiments as the variance correlates with the distance of the sound source captured by Y, with increasing variance corresponding to increased distance and vice versa a model may be constructed which provides an estimate of the distance given a certain value of variance of the DOA. For example the method described in an earlier invention by Laitinen & Vilkamo to obtain an estimate of the distance for the source given the variance of the DOA.

In some embodiments the HAIP based DOA estimate can be used for selecting the set of bands which are used for correlation analysis (for finding whether the external mic captured sources is dominating these bands). In such embodiments the system may pick those bands b where the dominant DOA based on audio analysis matches the HAIP provided DOA, and the correlation analysis may be performed only on these bands.

The distance estimate may be passed to the position tracker.

Figure 3:
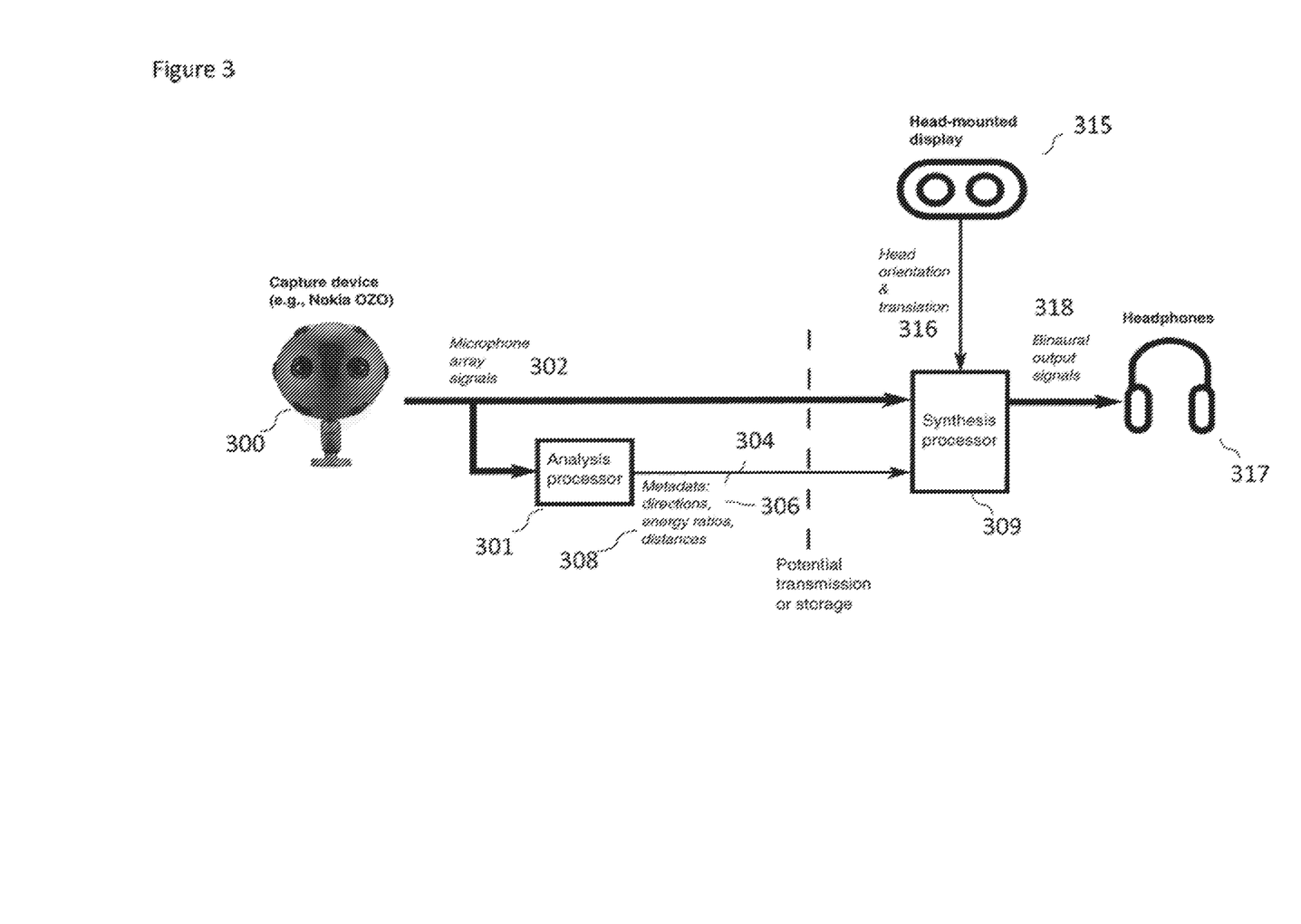
FIG. 3 shows a flow diagram of the operation of the source separator and audio based distance estimator as shown in FIG. 2 according to some embodiments.

With respect to FIG. 3 a flow diagram of the operation of the apparatus shown in FIG. 2 is shown.

The input microphone audio signals are first processed (if they are time domain audio signals) by the application of a STFT (or other suitable time to frequency domain transform).

The application of the STFT to the microphone audio signals is shown in FIG. 3 by step 301.

The audio signals may then be divided into sub-bands. The dividing of the audio signals into sub-bands is shown in FIG. 3 by step 303.

The selection of a sub-band to analyse is shown in FIG. 3 by step 305. The step 305 is the first operation in a loop shown from step 305 to 311 and which may be repeated for all of the sub-bands.

The determination of the sub-band direction of arrival estimate is shown in FIG. 3 by step 307.

The calculation of the sum or combined signal for the sub-band is shown in FIG. 3 by step 309.

The determination of whether the sub-band combined audio signal corresponds to one of the sound source microphone audio signal (and which one if there is more than one) is shown in FIG. 3 by step 311.

As discussed previously this loop may now pass back to step 305 to analyse a further sub-band.

The combination or generation of the set of DOA estimates associated with a specific sound source microphone is shown in FIG. 3 by step 313.

The determination of the variance of the DOA estimates within the set is shown in FIG. 3 by step 315.

The determination or updating of the distance based on the variance is shown in FIG. 3 by step 317.

Figure 4:
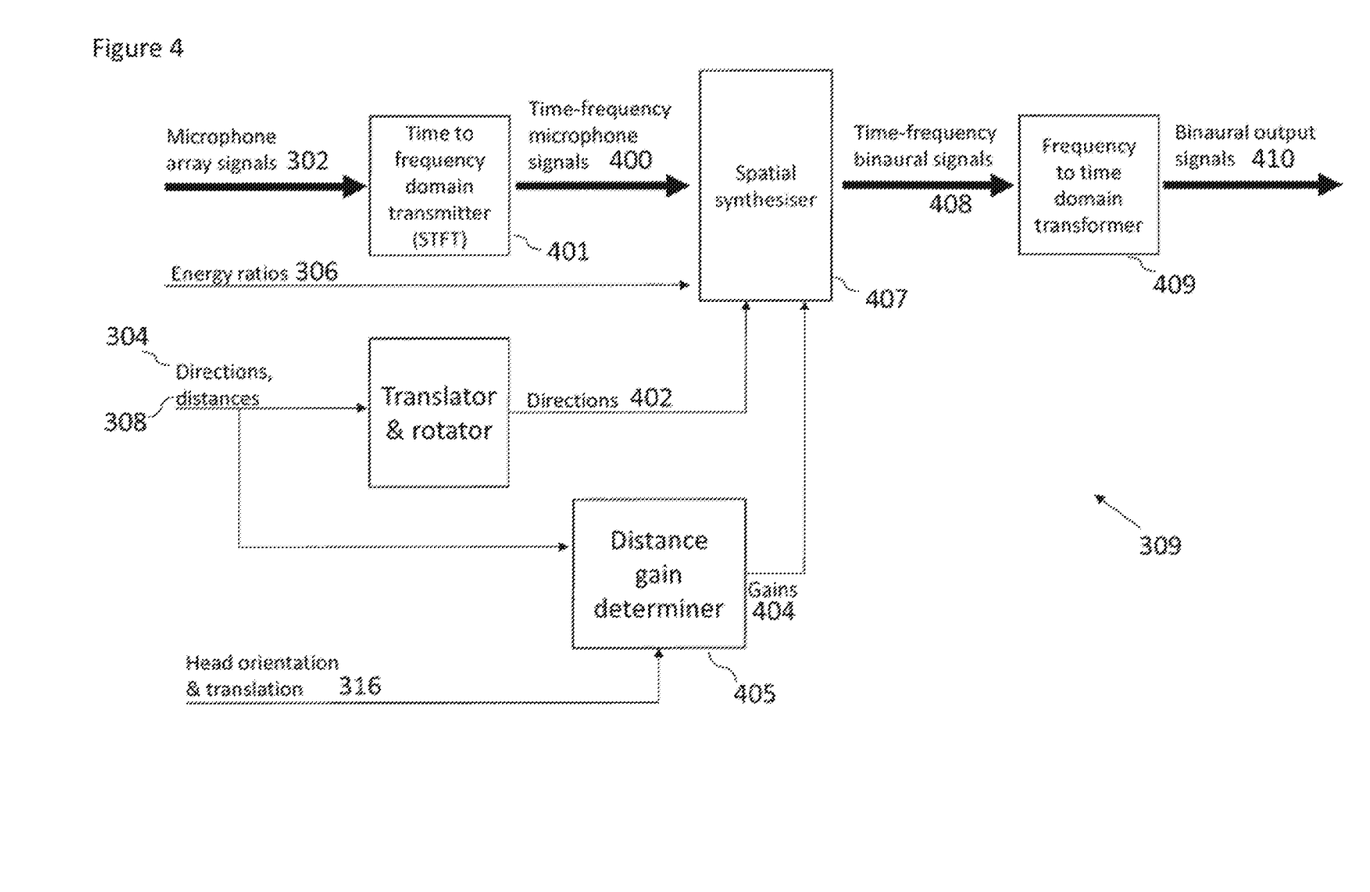
FIG. 4 shows schematically the position tracker shown in FIG. 1 in further detail according to some embodiments.

With respect to FIG. 4 a schematic view of the position tracker is shown in further detail.

In some embodiments the position tracker comprises a full-spherical co-ordinate determiner 401. The full-spherical co-ordinate determiner 401 is configured to receive the sound source (or sound source microphones) direction of arrival information from the positioner and furthermore the distance determined by the audio based distance estimator and generate a full spherical co-ordinate identifier associated with the sound source. Thus in some embodiments the full-spherical co-ordinate determiner 401 is configured to output for each of the sound sources an orientation, elevation and distance estimate.

Figure 5:
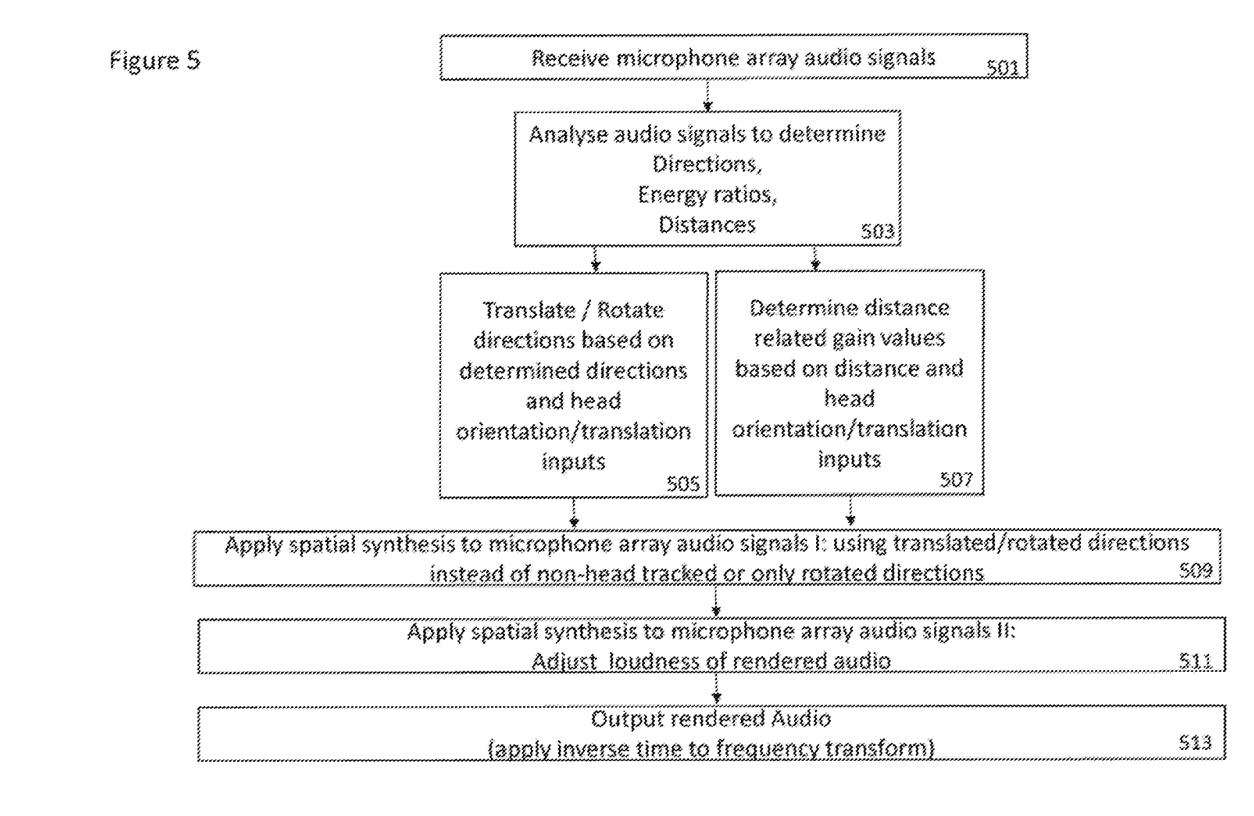
FIG. 5 shows a flow diagram of the operation of the full position co-ordinate determiner shown in FIG. 4 according to some embodiments.

The operation of the full-spherical co-ordinate determiner 401 is shown with respect to FIG. 5.

The operation of receiving the audio distance estimate and the positioner (HAIP) direction of arrival estimates is shown in FIG. 5 by step 501.

The operation of generating or compiling the full spherical co-ordinates associated with the sound source based on the received the audio distance estimate and the positioner (HAIP) direction of arrival estimates is shown in FIG. 5 by step 503.

In some embodiments the position tracker further comprises a direction of arrival (DOA) updater 403. The DOA updater is configured in some embodiments to receive the positioner estimated direction of arrival values and furthermore the audio based direction of arrival values and generate an updated or combined direction of arrival value. The system may also pool the azimuth & elevation estimates together. In other words the position tracker may use the audio based DOA estimates for bands $\{y_i\}$ to improve the indoor-positioning based DOA estimates. For example, a weighted average of audio based DOA estimates and the audio based DOA estimates may be calculated and used.

Figure 6:
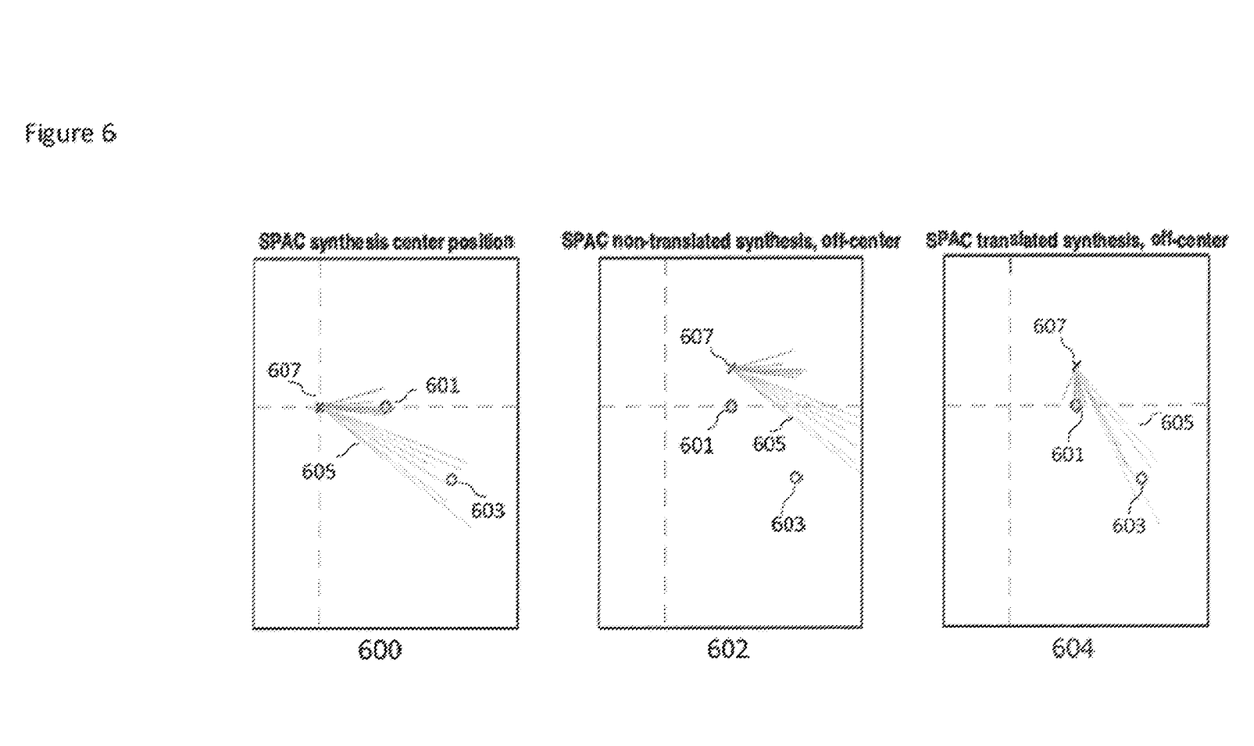
FIG. 6 shows a flow diagram of the operation of the direction of arrival updater shown in FIG. 4 according to some embodiments.

FIG. 6 for example shows the operation of the DOA updater shown in FIG. 5 according to some embodiments.

First the positioning DOA estimates and the audio based DOA estimates are received as shown in FIG. 6 by step 601.

Then the DOA estimate is updated using a combination of the positioning DOA estimates and the audio based DOA estimates as shown in FIG. 6 by step 603.

Figure 7:
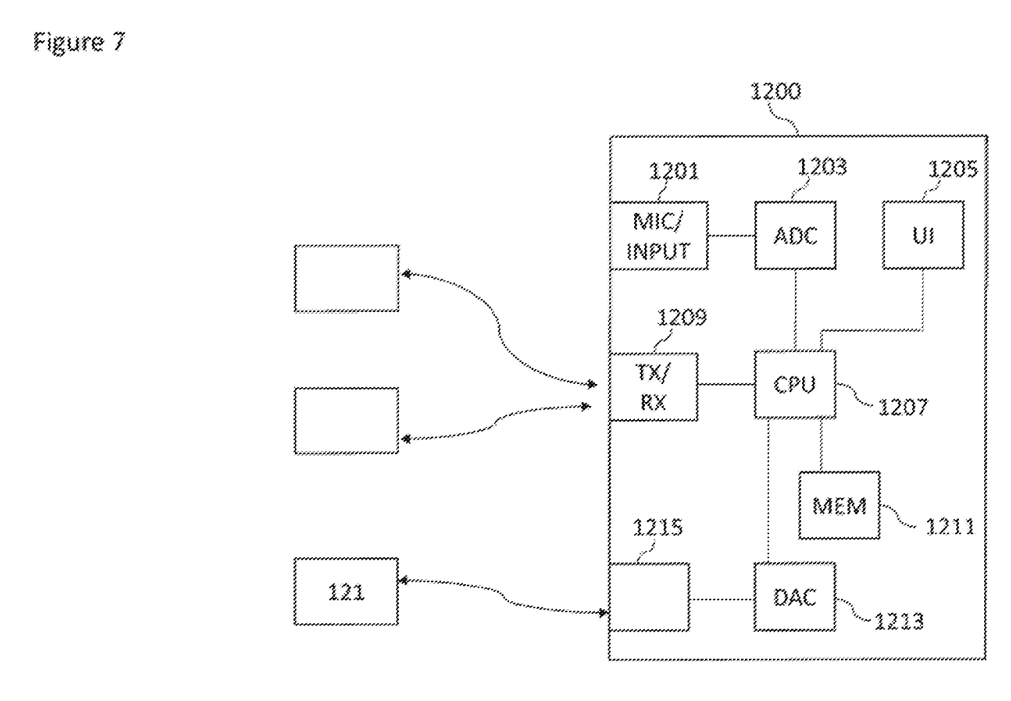
FIG. 7 shows schematically an example device suitable for implementing the apparatus shown in FIGS. 1, 2 and 4.

With respect to FIG. 7 an example electronic device which may be used as the mixer and/or ambience signal generator is shown. The device may be any suitable electronics device or apparatus. For example in some embodiments the device 1200 is a mobile device, user equipment, tablet computer, computer, audio playback apparatus, etc.

The device 1200 may comprise a microphone 1201. The microphone 1201 may comprise a plurality (for example a number N) of microphones. However it is understood that there may be any suitable configuration of microphones and any suitable number of microphones. In some embodiments the microphone 1201 is separate from the apparatus and the audio signal transmitted to the apparatus by a wired or wireless coupling. The microphone 1201 may in some embodiments be the microphone array as shown in the previous figures.

The microphone may be a transducer configured to convert acoustic waves into suitable electrical audio signals. In some embodiments the microphone can be solid state microphones. In other words the microphone may be capable of capturing audio signals and outputting a suitable digital format signal. In some other embodiments the microphone 1201 can comprise any suitable microphone or audio capture means, for example a condenser microphone, capacitor microphone, electrostatic microphone, Electret condenser microphone, dynamic microphone, ribbon microphone, carbon microphone, piezoelectric microphone, or microelectrical-mechanical system (MEMS) microphone. The microphone can in some embodiments output the audio captured signal to an analogue-to-digital converter (ADC) 1203.

The device 1200 may further comprise an analogue-to-digital converter 1203. The analogue-to-digital converter 1203 may be configured to receive the audio signals from each of the microphone 1201 and convert them into a format suitable for processing. In some embodiments where the microphone is an integrated microphone the analogue-to-digital converter is not required. The analogue-to-digital converter 1203 can be any suitable analogue-to-digital conversion or processing means. The analogue-to-digital converter 1203 may be configured to output the digital representations of the audio signal to a processor 1207 or to a memory 1211.

In some embodiments the device 1200 comprises at least one processor or central processing unit 1207. The processor 1207 can be configured to execute various program codes such as the methods such as described herein.

In some embodiments the device 1200 comprises a memory 1211. In some embodiments the at least one processor 1207 is coupled to the memory 1211. The memory 1211 can be any suitable storage means. In some embodiments the memory 1211 comprises a program code section for storing program codes implementable upon the processor 1207. Furthermore in some embodiments the memory 1211 can further comprise a stored data section for storing data, for example data that has been processed or to be processed in accordance with the embodiments as described herein. The implemented program code stored within the program code section and the data stored within the stored data section can be retrieved by the processor 1207 whenever needed via the memory-processor coupling.

In some embodiments the device 1200 comprises a user interface 1205. The user interface 1205 can be coupled in some embodiments to the processor 1207. In some embodiments the processor 1207 can control the operation of the user interface 1205 and receive inputs from the user interface 1205. In some embodiments the user interface 1205 can enable a user to input commands to the device 1200, for example via a keypad. In some embodiments the user interface 205 can enable the user to obtain information from the device 1200. For example the user interface 1205 may comprise a display configured to display information from the device 1200 to the user. The user interface 1205 can in some embodiments comprise a touch screen or touch interface capable of both enabling information to be entered to the device 1200 and further displaying information to the user of the device 1200. In some embodiments the user interface 1205 may be the user interface for communicating with the position determiner as described herein.

In some implements the device 1200 comprises a transceiver 1209. The transceiver 1209 in such embodiments can be coupled to the processor 1207 and configured to enable a communication with other apparatus or electronic devices, for example via a wireless communications network. The transceiver 1209 or any suitable transceiver or transmitter and/or receiver means can in some embodiments be configured to communicate with other electronic devices or apparatus via a wire or wired coupling.

For example as shown in FIG. 7 the transceiver 1209 may be configured to communicate with the renderer as described herein.

The transceiver 1209 can communicate with further apparatus by any suitable known communications protocol. For example in some embodiments the transceiver 1209 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

In some embodiments the device 1200 may be employed as at least part of the renderer. As such the transceiver 1209 may be configured to receive the audio signals and positional information from the microphone/close microphones/position determiner as described herein, and generate a suitable audio signal rendering by using the processor 1207 executing suitable code. The device 1200 may comprise a digital-to-analogue converter 1213. The digital-to-analogue converter 1213 may be coupled to the processor 1207 and/or memory 1211 and be configured to convert digital representations of audio signals (such as from the processor 1207 following an audio rendering of the audio signals as described herein) to a suitable analogue format suitable for presentation via an audio subsystem output. The digital-to-analogue converter (DAC) 1213 or signal processing means can in some embodiments be any suitable DAC technology.

Furthermore the device 1200 can comprise in some embodiments an audio subsystem output 1215. An example as shown in FIG. 7 shows the audio subsystem output 1215 as an output socket configured to enabling a coupling with headphones 121. However the audio subsystem output 1215 may be any suitable audio output or a connection to an audio output. For example the audio subsystem output 1215 may be a connection to a multichannel speaker system.

In some embodiments the digital to analogue converter 1213 and audio subsystem 1215 may be implemented within a physically separate output device. For example the DAC 1213 and audio subsystem 1215 may be implemented as cordless earphones communicating with the device 1200 via the transceiver 1209.

Although the device 1200 is shown having both audio capture, audio processing and audio rendering components, it would be understood that in some embodiments the device 1200 can comprise just some of the elements.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
processing circuitry; and
memory circuitry including computer program code, the memory circuitry and the computer program code configured to, with the processing circuitry, enable the apparatus to:
receive at least two audio signals from a microphone array located within a sound scene;
receive at least one further audio signal associated with at least one sound source from the sound scene;
determine at least one portion of the at least two audio signals from the microphone array corresponding to the at least one further audio signal, wherein the at least one portion is determined by identifying at least one sub-band, associated with the at least one sound source, of the at least two audio signals; and
determine a distance estimate to the at least one sound source based on the at least one portion of the at least two audio signals from the microphone array corresponding to the at least one further audio signal and at least one radio-based positioning system direction of arrival estimate, associated with the at least one sound source, comprising at least one of an azimuth value or an elevation value.

2. The apparatus as claimed in claim 1, wherein the apparatus is further configured to:
determine at least one audio sub-band positioning system direction of arrival estimate based on the identified sub-band of the at least two audio signals;
determine a variance based on the at least one audio sub-band positioning system direction of arrival estimate; and
determine the distance estimate to the at least one sound source based on the determined variance.

3. The apparatus as claimed in claim 2, wherein the apparatus configured to determine the variance is configured to:
combine the identified sub-band direction of arrival estimates;
divide the combined direction of arrival estimates by the cardinality of the at least one audio sub-band positioning system direction of arrival estimates;
determine the distance between 1 and the divided combined direction of arrival estimates; and
square root the distance to determine the variance.

4. The apparatus as claimed in claim 2, wherein the apparatus configured to determine the variance based on the at least one audio sub-band positioning system direction of arrival estimate is further configured to determine the variance based on the at least one audio sub-band positioning system direction of arrival estimate associated with the at least one sound source, a direction of arrival estimate and at least one radio-based positioning system direction of arrival estimate.

5. The apparatus as claimed in claim 2, wherein the apparatus configured to determine the variance is further configured to:
combine the at least one audio sub-band positioning system direction of arrival estimates and at least one radio-based positioning system direction of arrival estimates;
divide the combined estimates by the cardinality of the at least one audio sub-band positioning system direction of arrival estimates and the at least one radio-based positioning system direction of arrival estimates;
determine the distance between 1 and the divided combined estimates; and
square root the distance.

6. The apparatus as claimed in claim 2, wherein the apparatus configured to determine the at least one audio sub-band positioning system direction of arrival estimate is configured to:
determine a time delay between the at least two audio signals; and
determine the at least one audio sub-band positioning system direction of arrival based on the time delay.

7. The apparatus as claimed in claim 2, wherein the apparatus configured to identify the at least one sub-band of the at least two audio signals is further configured to:
combine the at least two audio signals to generate a sum audio signal;
filter the sum audio signal to generate sub-bands of the sum audio signal;
compare the sub-bands of the sum audio signal to at least part of the at least one further audio signal; and
identify the at least one sub-band based on the comparison.

8. The apparatus as claimed in claim 7, wherein the at least part of the at least one further audio signal comprises at least one of:
a sub-band filtered version of the at least one further audio signal; and
the at least one further audio signal.

9. The apparatus as claimed in claim 1, wherein the apparatus is further configured to determine a position estimate for the at least one sound source comprising a combination of the at least one distance estimate to the at least one sound source and a direction of arrival estimate associated with the at least one sound source.

10. A method for generating at least one distance estimate to at least one sound source within a sound scene comprising the least one sound source, the method comprising:
receiving at least two audio signals from a microphone array located within the sound scene;
receiving at least one further audio signal associated with the at least one sound source;
determining at least one portion of the at least two audio signals from the microphone array corresponding to the at least one further audio signal, wherein determining the at least one portion comprises identifying at least one sub-band, associated with the at least one sound source, of the at least two audio signals; and
determining a distance estimate to the at least one sound source based on the at least one portion of the at least two audio signals and at least one radio-based positioning system direction of arrival estimate, associated with the at least one sound source, comprising at least one of an azimuth value or an elevation value.

11. The method as claimed in claim 10, wherein determining the at least one portion of the at least two audio signals comprises at least one of:
determining at least one audio sub-band positioning system direction of arrival estimate based on the identified sub-band of the at least two audio signals;
determining a variance based on the at least one audio sub-band positioning system direction of arrival estimate; and
determining the distance estimate to the at least one sound source based on the determined variance.

12. The method as claimed in claim 11, wherein determining the variance comprises:
combining the identified sub-band direction of arrival estimates;
dividing the combined direction of arrival estimates by the cardinality of the at least one audio sub-band positioning system direction of arrival estimates;
determining the distance between 1 and the divided combined direction of arrival estimates; and
square rooting the distance to determine the variance.

13. The method as claimed in claim 11, wherein determining the variance further comprises determining the variance based on the at least one audio sub-band positioning system direction of arrival estimate associated with the at least one sound source, a direction of arrival estimate and at least one radio-based positioning system direction of arrival estimate.

14. The method as claimed in claim 11, wherein determining the variance further comprises:
combining the at least one audio sub-band positioning system direction of arrival estimates and at least one radio-based positioning system direction of arrival estimates;
dividing the combined estimates by the cardinality of the at least one audio sub-band positioning system direction of arrival estimates and the at least one radio-based positioning system direction of arrival estimates;
determining the distance between 1 and the divided combined estimates; and
square rooting the distance.

15. The method as claimed in claim 11, wherein determining the at least one audio sub-band positioning system direction of arrival estimate comprises:
determining a time delay between the at least two audio signals; and
determining the at least one audio sub-band positioning system direction of arrival based on the time delay.

16. The method as claimed in claim 11, wherein identifying at least one sub-band of the at least two audio signals comprises:
combining the at least two audio signals to generate a sum audio signal;
filtering the sum audio signal to generate sub-bands of the sum audio signal;
comparing the sub-bands of the sum audio signal to at least part of the at least one further audio signal; and
identifying the at least one sub-band based on the comparison.

17. The method as claimed in claim 16, wherein the at least part of the at least one further audio signal comprises at least one of:
   a sub-band filtered version of the at least one further audio signal; and
   the at least one further audio signal.

18. The method as claimed in claim 10, further comprising determining a position estimate for the at least one sound source comprising a combination of the at least one distance estimate to the at least one sound source and a direction of arrival estimate associated with the at least one sound source.

\* \* \* \* \*

UNITED STATES PATENT AND TRADEMARK OFFICE
CERTIFICATE OF CORRECTION

| | |
|---|---|
| PATENT NO. | : 11,644,528 B2 |
| APPLICATION NO. | : 16/626242 |
| DATED | : May 9, 2023 |
| INVENTOR(S) | : Antti Eronen et al. |

It is certified that error appears in the above-identified patent and that said Letters Patent is hereby corrected as shown below:

In the Claims

In Column 19, Line 57, Claim 10, delete "the least one sound" and insert -- the at least one sound --, therefor.

Signed and Sealed this
Twenty-second Day of August, 2023

Katherine Kelly Vidal
*Director of the United States Patent and Trademark Office*